Figure 1:
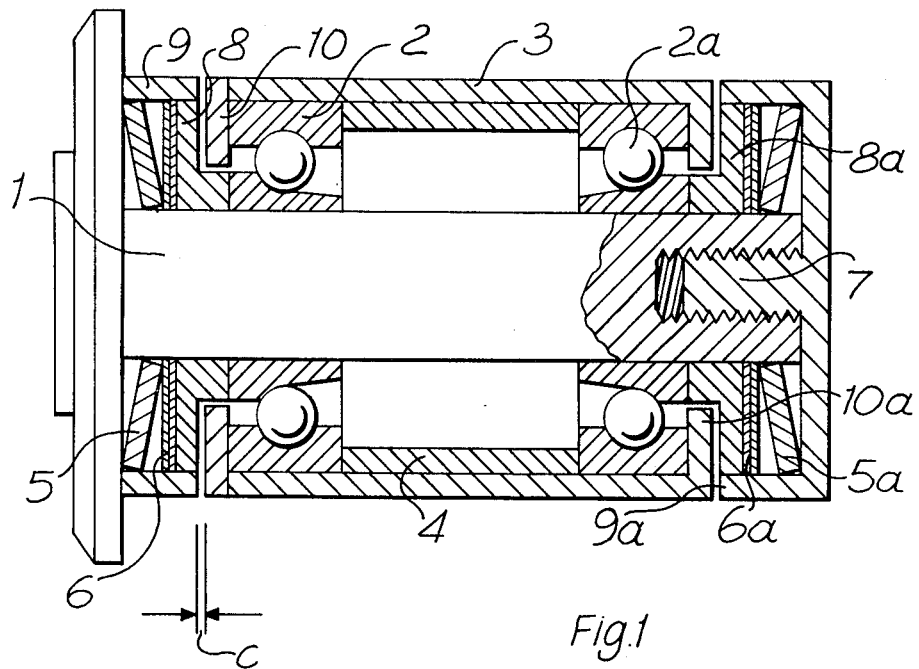

United States Patent [19]

Standing et al.

[11] 4,173,376
[45] Nov. 6, 1979

[54] BEARING ASSEMBLIES

[75] Inventors: John M. Standing, Stevenage; Joseph S. Sheppard, Harlow, both of England

[73] Assignee: Hawker Siddeley Dynamics Limited, England

[21] Appl. No.: 878,618

[22] Filed: Feb. 16, 1978

[30] Foreign Application Priority Data

Feb. 17, 1977 [GB] United Kingdom .................. 6585/77

[51] Int. Cl.² .............................................. F16C 33/00
[52] U.S. Cl. .............................. 308/189 A; 308/184 R
[58] Field of Search ........... 308/189 R, 189 A, 207 R, 308/207 A, 184 R, 184 A

[56] References Cited

U.S. PATENT DOCUMENTS

| | | | |
|---|---|---|---|
| 2,859,033 | 11/1958 | Rose | 308/184 R |
| 3,897,987 | 8/1975 | Colao | 308/184 R |

FOREIGN PATENT DOCUMENTS 463823 4/1937 United Kingdom ................ 308/207 R

*Primary Examiner*—Charles E. Frankfort
*Attorney, Agent, or Firm*—Rose & Edell

[57] ABSTRACT

A bearing assembly is provided in which bearing preload is exerted by both high and low rate non-linear springs, the low rate springs being substantially collapsed when the preload is applied. A shaft is mounted in two angular contact ball bearings contained in a housing with the bearing outer races maintained a fixed distance apart. The springs are two sets of hard and soft spring washers in tandem each set acting on a respective inner bearing race through the intermediary of a respective thrust member. Mechanical stop faces engage in the event of severe axial loading to prevent such excessive loads from being transmitted through the bearings. The amount of preload applied can be discerned from the width of gaps existing between faces on the thrust members and respective end faces on the housing.

7 Claims, 2 Drawing Figures

BEARING ASSEMBLIES

This invention relates to bearing assemblies. More particularly, it is concerned with bearing arrangements that are pre-loaded in order to avoid play or back-lash.

In the design of apparatus having a rotatable part it is desirable to eliminate both radial and longitudinal backlash and to accomplish this it is common to preload the bearing.

However, in use the apparatus may generate or receive heat causing various components to expand, and also there may be vibrational forces, as well as shock loads, all of which tend to make existing preloading techniques inadequate.

It is an object of the invention to provide means to overcome these problems without allowing high bearing loads to result and without allowing the critical frequency of the rotating masses to materially affect the bearing preload.

According to the present invention, there is provided a bearing preloading assembly comprising relatively high and low rate spring means acting in tandem, the high rate spring means providing the preload and the low rate spring means accommodating vibration and thermal dimensional changes.

Figure 1A:
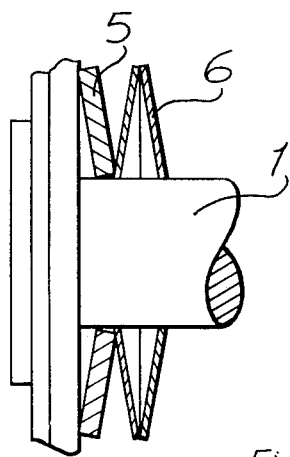

One arrangement embodying the invention will now be described by way of example and with reference to the accompanying drawings, in which:

FIG. 1 is a diagrammatic longitudinal section through a bearing assembly according to the invention, and FIG. 1a shows preloading washers of the assembly of FIG. 1 in an unloaded state.

A rotatable shaft 1, which may be coupled to a member to be rotated, is carried on angular contact ball bearings 2 and 2a contained within a housing 3, the axial distance between the outer races of these bearings being fixed and determined by a distance piece 4.

At each end of the shaft 1 are retained main spring washers 5 and 5a and soft spring washers 6 and 6a, spring washers 5 and 5a being high rate springs and spring washers 6 and 6a being low rate springs. These spring washers 5, 5a and 6, 6a are loaded axially inward toward one another to a required preload by means of a nut 7, the resulting load being applied to the inner races of bearings 2 and 2a through the intermediary of thrust members 8 and 8a.

The two groups of spring washers thus eliminate any bearing/shaft free movement axially, and radial movement is also eliminated by reason of the taper of the inner ball races of the bearings. To achieve a desired preload conveniently, the assembly is designed to provide a clearance C between an inner face of each thrust member 8, 8a and an adjacent end plate 10, 10a of the bearing housing, the clearance being measurable upon assembly.

Furthermore, it is arranged that low rate springs 6 and 6a are collapsed by the preloading on assembly, while springs 5 and 5a are uncollapsed and taking an appropriate small load. Should shaft 1 effectively lengthen in service then low rate springs 6 and 6a will expand with the result that the preloading spring assemblies will continue to assert a substantially constant load on the bearings. The soft springs 6, 6a also ensure that the preloading is maintained under vibration.

Should a shock load be transmitted along the longitudinal axis of the assembly, such as at the launch of a space vehicle carrying the apparatus, then spring 5 or 5a will be depressed until the end of a circumferential wall 9 or 9a, which serves to constitute a spring housing carried by the shaft, abuts against the end plate 10 or 10a of the bearing housing 3. The walls 9, 9a and the end plates 10, 10a thus constitute mechanical stops to sustain excessive axial loads.

From the above description the following features will be seen:

The preloading spring assembly combines soft and hard non-linear springs, enabling a compliant preload to be achieved by the springs that allow thermal differential expansion in service to occur without inducing high bearing loads. The two pairs of soft springs prevent bearing component separation under vibration, while the two hard springs provide the basic bearing preload and raise the critical frequency of the rotating mass outside the operating speed range. The springs are non-linear to reduce the impact of any load amplification at resonance induced by externally-excited vibration. Stops exist, separate from the springs, to prevent excessive axial loads being transmitted through the bearings.

We claim:

1. A preloaded bearing assembly including relatively high and low rate spring means acting in tandem, the high rate spring means providing the preload and the low rate spring means accommodating vibration and thermal dimensional changes, said assembly comprising a shaft journalled in two angular contact ball bearings mounted in a housing at opposite ends thereof, the outer races of the bearings being maintained at a fixed separation distance, and wherein the spring means are disposed in two sets, one out beyond each bearing, each set including high and low rate spring members in tandem acting on the inner race of the adjacent bearing through the intermediary of a respective thrust member.

2. An assembly according to claim 1, wherein the spring means have non-linear spring rates to reduce the effect of any load induced at resonance by externally-generated vibration.

3. An assembly according to claim 1, further comprising mechanical stops, separate from the spring means, to prevent excessive axial loads being transmitted through the bearings.

4. An assembly according to claim 3, wherein the stops are provided by end faces on the housing and the ends of circumferential walls carried by the shaft and surrounding the spring members.

5. An assembly according to claim 1, wherein the spring members are in the form of high and low rate spring washers, the low rate spring washers only being substantially collapsed when the preload is applied.

6. An assembly according to claim 1 or claim 5, wherein the spring members beyond one bearing are located between the respective thrust member and a flange on the shaft, and the spring members beyond the other bearing are located between the other thrust member and a nut on the shaft that can be adjusted axially to set the preload.

7. An assembly according to claim 1 or claim 5, wherein a gap is provided between a face on each thrust member and a parallel face on the adjacent end of the housing, each gap reducing in width as the preload increases whereby the width of these gaps indicates the amount of preload applied.

* * * * *